(12) United States Patent
Rupaner et al.

(10) Patent No.: US 6,252,018 B1
(45) Date of Patent: Jun. 26, 2001

(54) USE OF A SINGLE-STAGE OR MULTISTAGE STIRRER TO PREPARE POLYMERS

(75) Inventors: Robert Rupaner, Ellerstadt; Sven Lawrenz, Mannheim; Gerhard Bauer, Weinheim; Johannes Dobbelaar, Wachenheim; Jürgen Nahstoll, Eisenberg; Franz-Josef Mueseler, Neustadt; Axel Ferber, Worms; Jürgen Hartmann, Frankenthal; Peter Keller, Hirschberg; Martin Meister; Josef Neutzner, both of Neustadt; Gerd Rehmer, Beindersheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/039,189

(22) Filed: Mar. 16, 1998

(51) Int. Cl.[7] ........................................ C08F 2/01
(52) U.S. Cl. ..................... 526/88; 523/318; 523/324; 422/135
(58) Field of Search ................. 523/318, 324; 422/135; 526/88

(56) References Cited

U.S. PATENT DOCUMENTS

| | | | |
|---|---|---|---|
| 4,009,226 | * | 2/1977 | Ott . |
| 4,125,574 | * | 11/1978 | Kastner . |
| 4,438,074 | * | 3/1984 | Wilt . |
| 4,552,461 | * | 11/1985 | Ott . |
| 5,145,255 | * | 9/1992 | Shimada . |
| 5,760,148 | * | 6/1998 | Muller . |
| 5,840,786 | * | 11/1998 | Beck . |

FOREIGN PATENT DOCUMENTS

15994  *  6/1995  (WO) .

* cited by examiner

Primary Examiner—David J. Buttner
(74) Attorney, Agent, or Firm—Oblon, Spivak, McClelland, Maier & Neustadt, P.C.

(57) ABSTRACT

At least one single-stage or multistage stirrer which produces not only a tangential flow component but also an axial flow field is used in a stirred-vessel reactor in connection with the preparation of polymers by liquid phase polymerization.

12 Claims, 2 Drawing Sheets

USE OF A SINGLE-STAGE OR MULTISTAGE STIRRER TO PREPARE POLYMERS

FIELD OF THE INVENTION

The invention relates to the use of a single-stage or multistage stirrer.

DISCUSSION OF RELATED ART

The preparation of polymers by liquid phase polymerization is customarily subdivided into bulk, solution, precipitation, suspension and emulsion polymerization, the latter two polymerization techniques differing from the others in that they start from an already two-phase initial mixture. The polymerization reaction is in this case conducted in a batch reactor, in a continuous flow pipe, in a cascade of stirred vessels or in a continuous stirred-vessel reactor. In this context it is the vessel reactors which have acquired the most importance in the chemical industry, since they permit very great flexibility in terms of operating conditions and mode of operation and can be adapted to virtually all process requirements. Stirred-vessel reactors are suitable for continuous and batchwise operation and possess broad scope for use, ranging from laboratory vessel to large-scale reactor. Stirred-vessel reactors are obtainable in standardized construction for numerous applications, in a wide variety of materials and combinations of materials. Stirred-vessel reactors are easy to access and clean and permit relatively simple changeover to alternative polymerization reactions (see for example Ullmann, Volume 3, 4th ed., pp. 505–510).

In addition to the customary cooling and heating devices, feed lines and discharge lines for starting materials and reaction products, the reactor vessels feature stirring devices which consist in most cases of a stirrer, driven by a stirring shaft, and for certain applications also have stators which act as flow disrupters for more complete mixing. The stirrers themselves are fastened to in most cases vertical stirrer shafts which project either from above or from below into the—generally cylindrical—reactor vessel. Central installation from above into the reactor vessel is generally preferred, since the stirrer shaft can be sealed off with relative ease. A disadvantage is that the stirrer shaft must have a relatively large diameter because of the bending moments which occur. Introducing the stirrer from below into the reactor, on the other hand, reduces the mass of the stirrer but at the same time requires more complex sealing of the stirrer shaft as it penetrates the reactor floor.

Ullmann's Encyclopedia of Industrial Chemistry, 5th Edition, Volume B2, Chapter 25 discloses a very wide variety of stirrers, for example propeller stirrers, disk stirrers, anchor stirrers, impeller stirrers, blade stirrers, MIG stirrers, etc.

In comparison with customary stirring techniques, such as the preparation and homogenization of solutions, two-phase liquid phase polymerization is accompanied by a number of particular problems that are particularly significant for the design of the reactor and for the mode of operation. Virtually all polymerization reactions are exothermic. The reaction enthalpy released can reach very high levels of up to about 4000 kJ/kg. The mean molar masses of the polymers are usually in the range from $10^4$ to $10^7$. This means that, as with polymerization in bulk or solutions, the viscosity can rise by up to six powers of 10 during the reaction. This leads to greater difficulty in mass transfer, heat dissipation, mixing and stirring owing to the increasing viscosity of the reaction mixture. A further problem is the decrease in jacket cooling area in relation to volume as the size of the reactor vessel increases.

Consequently, there are particular requirements for stirrers in connection with liquid phase polymerization in stirred-vessel reactors. These requirements include reliable homogenization and uniform stirring; in other words, differences in temperature and concentration must be compensated and the formation of dead zones must be avoided. For example, in the case where a monomer emulsion is supplied from above or below into the reactor, it must be mixed with the polymerizing reaction mixture in order to supply fresh monomer to all volume elements in the reactor, so that the formation of off-specification polymer is avoided. It is additionally known that, deposition of polymer on the walls and internals tends to occur particularly in dead zones in the reactor chamber. This is essentially an axial conveyance function.

The stirrer is also required, depending on the reaction system, to disperse, suspend or emulsify. For example, although it is possible in the case of emulsion polymerization first to produce an emulsion of water, surfactant solution and monomer mixture in a stock vessel and then to supply said emulsion to the stirred-vessel reactor, it is known that the monomer droplets need to be made smaller still by the stirrer. In the case of reaction regimes where pure monomer is added, moreover, it must be emulsified, in other words reduced in size to microdroplets and homogenized. It is preferred to supply a monomer mixture, an emulsion or a monomer/water mixture formed shortly before entry into the reactor.

The stirrer must not, furthermore, form any zones of high shear, so as to prevent the formation firstly of coagulum and secondly of foam. It is known, indeed, that in zones of particularly high shear there is formation of coagulum structures which likewise lead to off-specification product and contaminate the remaining product (gel specks, fine coagulum). In extreme cases the entire contents of a reactor may coagulate. A good overview of the problem is given by J. B. P. Soares and A. E. Hamilec "Overview of Emulsion Polym. Reactors" (paper given at the NATO Conference "Recent Advances in Polymeric Dispersions" in Elizonto, Navarra, Spain, in June 1996).

German Patent DE-C1-44 21 949 discloses a modified blade stirrer for emulsion polymerization which is preferably used to prepare homopolymers, copolymers or graft copolymers of vinyl chloride. To avoid excessive shearing of the polymer latex and resulting formation of coagulum, a blade stirrer is proposed which avoids sharp edges and angular profiles, featuring instead progressively curved outer edges which have a droplet-shaped profile when viewed from above, and rounded-off top and bottom edges.

Japanese Patent Application JP-A-07, 292,002 discloses a stirred-vessel reactor which has a stirrer of multistage construction for the emulsion polymerization of polymer latices, little microcoagulum being produced. The stirrers presented are essentially single-stage, two- or three-stage modified blade stirrers.

WO-A-93 22 350 likewise relates to different types of stirrer for polymerizations, where little microcoagulum is to be produced. This patent application too essentially describes variants of multiple blade stirrers.

Both JP-A-07, 292,002 and WO-A-93 23 350 describe stirrer systems which in each case have flow disrupters and angled stirrer blades and lead to dispersions of narrow distribution.

A factor of particular importance in the implementation of polymerization reactions in stirred-vessel reactors is that of heat dissipation. If it is desired to avoid the cooling internals in the interior of the reactor that are known from the prior art, an important requirement of the stirring system is that it should ensure high heat transfer with the reactor walls. Usually there are then suitable cooling devices provided on the outside of the reactor walls. The high reaction enthalpy released in the course of polymerization reactions is intensified in the case, for example, of emulsion polymerization in that a high monomer concentration is required in order to attain a high degree of polymerization with narrow molecular weight distribution and to suppress competing side reactions. A high concentration of monomer, however, is also associated with a high polymerization rate and, correspondingly, a high level of release of heat which must be conducted away from the system. If heat removal is inadequate the result, especially in the case of systems which have not been homogeneously mixed, is local temperature fields which have an adverse effect on product quality, especially in the case of crosslinked polymer systems. It is evidently necessary to use for this purpose a very close-clearance stirrer.

In addition, the stirring system must ensure minimal vortexing so that only small amounts of gas, for example inert gases such as nitrogen, are drawn in, and intensified foaming of surfactant-containing systems is avoided.

With maximum possible variation in the stirring system in respect of the viscosity ranges and monomer systems which can be employed, the stirring device should feature minimal energy consumption.

Not only the reaction enthalpy developed in the course of the polymerization reaction but also the energy introduced by the stirrer into the system and dissipated must be conducted away. The power output of the stirrer apparatus depends both on the viscosity of the reaction medium and on the stirrer speed. The problem here is that a higher speed, although leading to a higher heat transfer coefficient, at the same time also increases the power output by the stirrer. It has been found that the stirring power deployed generally depends more on the speed than on the heat transfer coefficient, so that the net heat dissipation of the overall system is optimum for a particular stirrer speed. However, especially in the case of emulsion polymerization, the shear sensitivity of the products means that this optimum speed cannot be set.

It is also known that mixing in the reactor is particularly effective at high Reynolds numbers above the laminar range. However, here again there is the problem that the desired turbulent range can often not be achieved owing to the shear sensitivity and viscosity of the polymers. Flow disrupters in the reactor increase the turbulence of the medium, but can only be employed in the case of products with relatively low sensitivity to shearing.

In the case of two-phase systems frequently there are complex particle size distributions, for example a bi-, tri-, tetra- or polymodal distribution or narrow or broad distributions, or else combinations thereof, which lead to particular product properties. Consequently, slight differences in the particle size distribution, as a result for example of the influence of the high shear loads on the stirrer or the internals, affect the end product properties. For this reason the reproducibility of the particle size distribution of different product batches in a particular reactor/stirrer combination is particularly important.

H. Gerstenberg et al., Chem. Ing. Techn. 54 (1982) 541–553, recommend helical stirrers and cross-arm agitators for bulk and solution polymerization, whereas cross-arm agitators, axial-flow turbines, MIG and InterMIG stirrers are used for precipitation polymerization.

Zopf and Moser, Verfahrenstechnik 8 (1) (1974) 1–6 and 8 (2) (1974) 60–62 arrive at the conclusion, in a detailed process engineering study using carboxymethylcellulose solutions of different viscosity as the stirred medium, that a propeller stirrer is the most appropriate stirrer for emulsion polymerization. They do not go into the problems of different monomers, their different solubilities, the particle size distributions and their reproducibilities, nor into a change of product and polymerization technique in an industrial polymerization reactor.

A. Echte, Handbuch der technischen Polymerchemie, 1993, refers on page 464 in connection with the emulsion polymerization of vinyl acetate to various stirrers, specifically anchor and impeller stirrers, gate agitators and MIG stirrers, without specifying more detailed criteria for selection.

SUMMARY OF THE INVENTION

It is an object of the present invention, therefore, to provide a stirring system for stirred-vessel reactors which ensures a high measure of mixing and heat dissipation with low power output and low shear. The stirring system should be suitable in particular for implementing liquid phase polymerization, especially emulsion, suspension or solution polymerizations. At the same time, in view of the shear sensitivity of numerous polymers, it should also be possible if appropriate to do away with the need to use flow-disrupting internals (baffles) in the reactor.

We have found that this object is achieved by the use of multistage, very close-clearance stirring elements which produce not only a tangential flow component but also an axial flow field.

DESCRIPTION OF THE PREFERRED EMBODIMENTS

The present invention accordingly provides for the use of at least one single-stage or multistage stirrer which produces not only a tangential flow component but also an axial flow field in a stirred-vessel reactor in connection with the preparation of polymers by liquid-phase polymerization, with the exception of precipitation, solution and bulk polymerization (as defined at the outset), especially by heterophase polymerization.

In this case the stirrer can enter the reactor from the top, bottom or side. While it is customary to use one stirrer per reactor, the use of two or more stirrers per reactor is also possible. The use of a multistage stirrer couples low power output by the stirrer with the generation of a flow field having pronounced tangential and radial components, so that both good homogenization and effective heat dissipation— by increasing the heat transfer coefficient between the polymer solution and the reactor wall—are ensured.

The stirrer is advantageously a helical stirrer. Helical or ribbon stirrers are known per se and generally consist of a ribbonlike helix held by spokes on the stirrer shaft. Whereas the ribbonlike helix produces a pronounced tangential component of the flow in the polymer solution when the stirrer is rotated, the axial component is induced by a displacement effect in the laminar flow region. Helical stirrers are in most cases close-clearance stirrers, so the ratio of stirrer diameter to reactor internal diameter is usually in the range from 0.9 to 0.98. The ratio of the width of the helical ribbon to the stirrer diameter is typically about 0.1.

In the case of another use in accordance with the invention, the stirrer is a coaxial stirrer. Coaxial stirrers feature a close-clearance stirrer in anchor form and a high-speed coaxial, central stirrer with separate drive. The close-clearance anchor stirrer produces the tangential component of the flow, while the central stirrer, which can be single-stage or multistage in construction, produces the axial component. Suitable central stirrers are a wide variety of common stirring systems whose specific configuration is determined by the particular task. For better mixing of the boundary layer at the vessel wall, the anchor stirrer frequently has scraper strips which turn over the boundary layer mechanically. In general, anchor stirrers and central stirrers rotate in the same direction but at different speeds. In the case of highly viscous polymer solutions, for example, an anchor stirrer rotating at a markedly slower speed effectively prevents the rotation of the entire contents of the vessel.

Multistage stirrers employed with particular advantage are cross-arm agitators, multiflow stirrers and MIG® and INTERMIG® stirrers. Cross-arm agitators and multiflow stirrers have one flow director, while the MIG® (Mehrstufen-Impuls-Gegenstrom [multistage pulse countercurrent]) and INTERMIG® (interference multistage pulse countercurrent) stirrers from EKATO have two or more flow directors per blade or, respectively, have a multiplanar end. The stirrer can also be configured as a combination of these stirrers, each stage being one of said stirrers.

The stirrer can advantageously have, in addition, at least one blade, pitched-blade, impeller, propeller or Pfaudler stirrer.

In one variant of the invention the multistage stirrer is a multiple blade stirrer. The stirrer preferably has 2 to 7 blade stages arranged along a stirrer shaft. Successive blade stages need not necessarily be equidistant in the axial direction.

Successive blade stages are preferably offset by 90°, since the mass distribution of the stirring element that is achieved by this orientation leads to the lowest tendency toward imbalance and to the best mixing action. However, other angular orientations are likewise possible.

Each blade stage advantageously consists in the radial direction of two- to seven-piece, centrosymmetrically arranged blades. To save weight a two-piece, opposing configuration is preferred.

In cases where there are no flow-disrupting internals in the stirred-vessel reactor, the ratio of stirrer diameter to reactor diameter is advantageously from 0.5 to 0.98, preferably from 0.6 to 0.95 and, with particular preference, from 0.7 to 0.9. In cases where there are flow-disrupting internals in the stirred-vessel reactor, the ratio of stirrer diameter to reactor diameter is advantageously from 0.5 to 0.9, preferably from 0.55 to 0.88 and, with particular preference, from 0.6 to 0.8.

For polymerization reactions, very close-clearance stirrers prove particularly advantageous.

For especially good homogenization the ratio of the distance separating the stirrer stages to the reactor diameter is advantageously in the range from 0.75 to 1.3 and, preferably, in the range of 1.

The ratio of the distance of the lowest stirring stage from the floor of the reactor to the diameter of the lowest stirring stage is preferably from 0.2 to 2, particularly preferably from 0.3 to 1. It is advantageous to arrange an additional blade below the lowest stirring stage. Such an additional blade stirrer makes it possible to minimize the unstirred dead volume; for example, small initial charges of seed latices can be stirred effectively.

The edges and angles of the blades are preferably rounded, so that the shear forces acting on the polymer can be kept low even at relatively high speeds of rotation. To reduce the formation of deposits the stirrer, furthermore, preferably has a smooth surface. Such surfaces can be realized, for example, either with stirrer components made from polished or electropolished stainless steel or with enameled stirrer components.

The speed of the stirrer is advantageously from 10 to 200 revolutions per minute. This chosen speed is determined essentially by the reaction medium, for instance by its viscosity, and by the properties of the product, for instance the sensitivity to shearing.

The stirred-vessel reactor can have an essentially cylindrical form, the ratio of reactor height to reactor diameter advantageously being from 1 to 7, preferably from 1.1 to 5 and, with particular preference, from 1.2 to 3.

With all stirrers it is also possible to guide the shaft through the reactor floor; in other words, the stirrer is introduced and driven starting from the floor of the reactor.

Preferably, all components are introduced into the reactor through its floor.

It is particularly advantageous if the stirrer and the components are introduced from the floor of the reactor, and the lid of the reactor is removable.

Liquid phase polymerizations include the addition polymerizations of ethylenically unsaturated monomers, such as suspension or emulsion polymerization, including mini, micro and inverse emulsion polymerization, and also polycondensations and polyadditions. The polymer can be a homopolymer or a copolymer.

In one variant of the invention the multistage stirrer is used to prepare polymer dispersions by suspension or emulsion polymerization. The polymer dispersions generally have a solids content of from 30 to 75% by weight, preferably from 50 to 72% by weight and, with particular preference, from 52 to 70% by weight.

The multistage stirrers are particularly suitable for preparing highly viscous polymer dispersions. The dynamic viscosity is in general in the range from 20 to 6000 mPas, in particular from 30 to 2000 mPas (measured in accordance with DIN 53019).

The polymer dispersions can be monomodal or polymodal and can have a broad or narrow particle size distribution.

The glass transition temperature of the resulting polymers is in general in the range from −100° C. to +150° C., preferably from −60° C. to +70° C.

In accordance with the invention the monomers can be passed into the reactor in the form of a preferably aqueous emulsion or a solution in water or an appropriate organic solvent. In one particular variant of the invention the monomers for the emulsion polymerization are led as they are (in bulk) into the reactor. The multistage stirrers employed in accordance with the invention have proven suitable for bringing about the emulsification, i.e. the droplet size reduction, of the monomers in the aqueous phase in the reactor in the presence of emulsifiers or protective colloids.

The monomers and/or co-reactants and/or auxiliaries can be passed into the reactor from above through the reactor lid, through the reactor sidewalls or, preferably, from below through the reactor floor. The latter method has the advantage that the formation of wall deposits is less and that mixing-in takes place more rapidly. In addition, the suspension or emulsification process is assisted by the density difference, and less foaming is observed.

It has also been found that, with the aid of the stirrers employed in accordance with the invention, the reproducibility of polymer dispersions in the case of repeat batches is improved. This applies in particular to the particle size distribution.

Ethylenically unsaturated monomers suitable for polymerization are, in particular, $C_2$–$C_{20}$ α-olefins, such as ethylene and propylene, vinylaromatic compounds, such as styrene, α-methylstyrene or vinyltoluenes, $C_1$–$C_{12}$-alkyl vinyl ethers, such as methyl or ethyl vinyl ether, vinyl esters of $C_1$–$C_{18}$ monocarboxylic acids, such as vinyl acetate or vinyl propionate, esters of α,β-ethylenically unsaturated mono- or dicarboxylic acids, such as acrylic, methacrylic or maleic acid, with $C_1$–$C_{12}$-alkanols, such as methanol, ethanol, n-propanol, isopropanol, 1-butanol, 2-butanol, isobutanol, tert-butanol and 2-ethylhexanol, acrylonitrile, methacrylonitrile, butadiene, isoprene, vinyl chloride, vinylidene chloride, α,β-ethylenically unsaturated $C_3$–$C_6$ monocarboxylic and dicarboxylic acids, such as acrylic acid and methacrylic acid, and their amides, such as acrylamide and methacrylamide, and the N-methylol compounds thereof.

In accordance with the invention the multistage stirrer is advantageously used to prepare dispersions, especially styrene-butadiene, styrene-acrylate, vinyl acetate, ethylene vinyl acetate or acrylate dispersions. It is advantageous to prepare dispersions having a broad particle size distribution and/or having a viscosity of from 0.01 to 50 Pas, preferably from 0.03 to 1.50 Pas.

Preferred polymers are
homopolymers or copolymers of acrylic and methacrylic esters, in particular of methyl, ethyl, n-butyl, tert-butyl and ethylhexyl acrylate, hydroxyethyl and hydroxypropyl acrylates and methacrylates
homopolymers or copolymers of styrene with butadiene and/or (meth)acrylonitrile and/or the abovementioned (meth)acrylic esters
homopolymers or copolymers of vinyl acetate and/or vinyl propionate with ethylene, butadiene or the abovementioned (meth)acrylic esters
homopolymers or copolymers of vinyl chloride and/or vinylidene chloride with the abovementioned (meth) acrylic esters, olefins or vinylaromatic compounds
homopolymers or copolymers of acrylic acid, methacrylic acid or maleic acid with other acids or acid anhydrides such as maleic acid (anhydride), (meth)acrylamide, and/or olefins.

It has been found that, in the case of the two-phase polymerization of monomer mixtures containing more than about 30% by weight of a readily water-soluble monomer which is nevertheless not soluble in water in homopolymerized form, there are sufficient concentrations of the monomer in both phases during the polymerization reaction. In such cases, good dispersing properties of the stirrers are unnecessary. Examples of such monomers are vinyl acetate, acrylonitrile, methacrylonitrile and methyl acrylate.

The polymerization temperature is usually from 30 to 140° C. To initiate the emulsion polymerization the customary water-soluble free-radical initiators are employed in an amount of preferably from 0.05 to 3% by weight, based on the monomer phase. Examples of free-radical initiators are peroxides, such as ammonium peroxodisulfate, potassium peroxodisulfate, hydrogen peroxide, mono- or diacyl peroxides or alkyl hydroperoxides, and also azo compounds. Initiation can be accomplished either directly, by raising the temperature, or by the use of reducing agents (redox system).

Dispersants which can be employed in the emulsion polymerization are common ionic and nonionic emulsifiers or protective colloids, and also mixtures of cationic and anionic emulsifiers. It is preferred to employ from 0.1 to 5.0% by weight of emulsifiers, based on the monomer phase. Polymerization can also be carried out if desired using buffer substances, such as sodium carbonate, sodium hydrogen phosphate or alkali metal acetates, or polymerization regulators or crosslinking monomers, such as bisacrylates or N-methylol compounds.

The polymerization can be conducted continuously or batchwise, with or without the use of seed latices, with all or some constituents of the reaction mixture being included in the initial charge, or with some constituents or individual consituents being included in the initial charge and some fed in, or by a gradual feed method without an initial charge.

Suspension polymerization, in the case for example of the polymerization of vinyl chloride, styrene or acrylonitrile, generally produces relatively large particles, thereby placing heightened requirements on axial mixing and suspension and thus on the homogenization capacities of the stirrer.

A multistage stirrer also proves particularly suitable in connection with the chemical aftertreatment or workup of a polymer dispersion or else in connection with the treatment and/or mixing of a polymer dispersion with steam, in cases where homogenization, minimization of mixing times and an improvement in mass transfer are in the foreground.

Further details on the addition polymerization of ethylenically unsaturated compounds are given, for example, in Houben-Weyl, Volume XIV/1, Makromolekulare Stoffe [Macromolecular Substances], George Thieme Verlag, Stuttgart, 1961.

Polycondensation includes in particular the preparation of polyesters, polyamides and condensation resins, while polyaddition includes, in particular, the formation of polyurethane. Further details are again given in Houben-Weyl, loc. cit.

The invention is illustrated below with reference to embodiments, which are shown in the attached drawings, and to practical examples.

BRIEF DESCRIPTION OF THE DRAWINGS

FIG. 1 shows diagrammatically a stirred-vessel reactor 10 for liquid phase polymerization. The reactor 10 features an essentially cylindrical vessel 11 and a stirrer mechanism 12 which in the case depicted enters the reactor from the top. The outer wall of the container 11 can be provided with cooling devices (not shown). The stirrer mechanism 12 consists of an electric motor 13 which is top-mounted on the vessel 11 and drives the stirrer via a stirring shaft 14.

Figure 2:
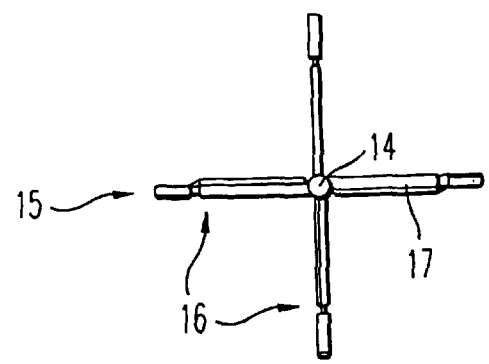
FIG. 2 shows a plan view of the stirrer of FIG. 1.

In the example depicted, the stirrer is a 6-stage EKATO-MIG® stirrer 15 whose adjacent stages 16, as evident in particular from FIG. 2, are each rotationally offset relative to one another by 90°. Each stage 16 consists of two-piece, centrosymmetrically arranged stirring blades 17. At the bottom end of the shaft 14 there is a blade stirrer 18 which minimizes the unstirred dead volume on the container floor. Feed and discharge lines for reaction media, and flow-disrupting internals which may be arranged in the interior of the container 11, are not depicted.

Figure 1:
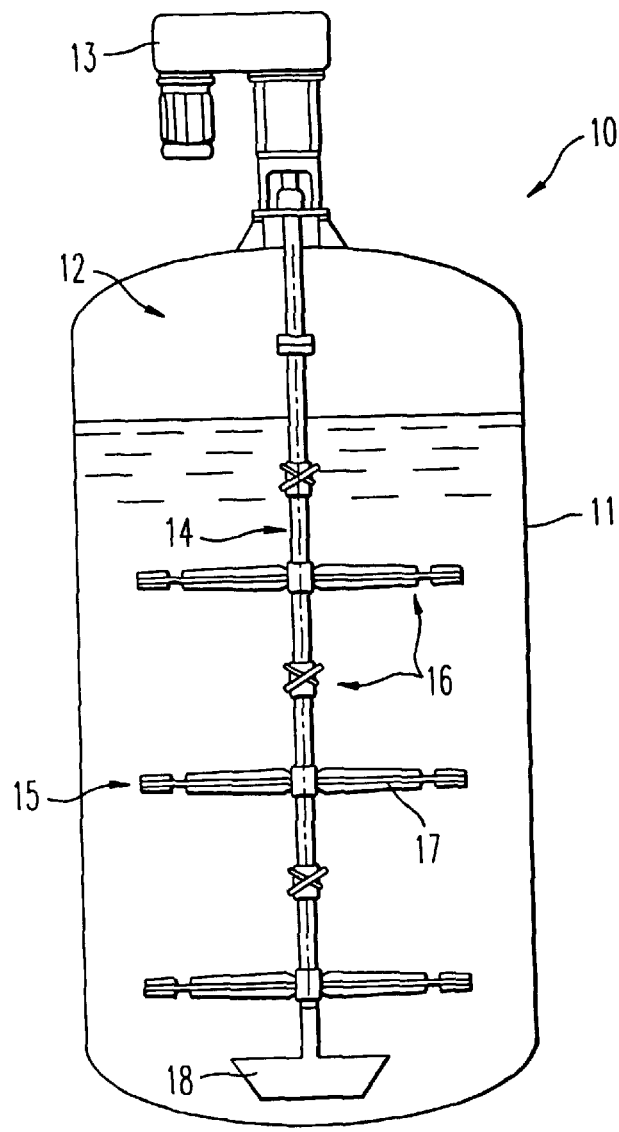
FIG. 1 shows a diagrammatic longitudinal section through a stirred-vessel reactor with a MIG® stirrer.

FIG. 2 shows a plan view of the MIG® stirrer 15 (without motor 13) of FIG. 1. It can be seen that successive stages 16 are offset relative to one another by 90°.

Figure 3:
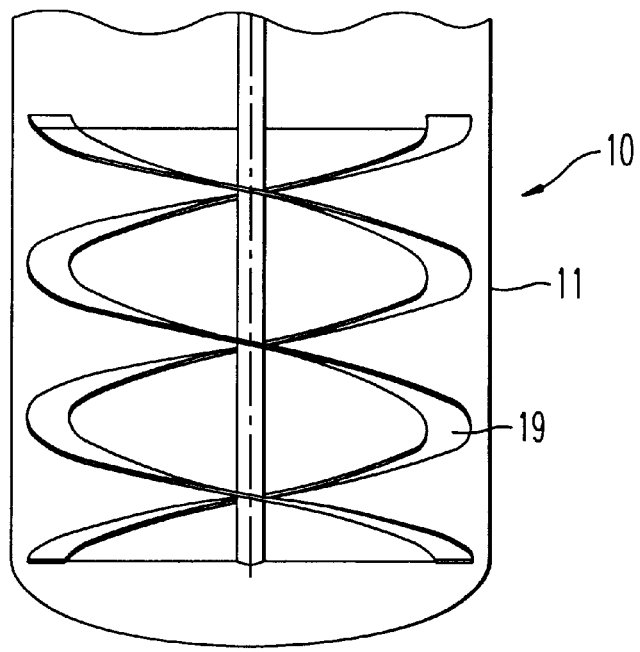
FIG. 3 shows a diagram of part of a stirred-vessel reactor, in longitudinal section, with a helical stirrer.

FIG. 3 shows a variant in which a helical stirrer 19 is arranged in the vessel 11 of the stirred-vessel reactor 10. In this case the two intermeshing helices constitute the multistage feature of the stirrer.

Figure 4:
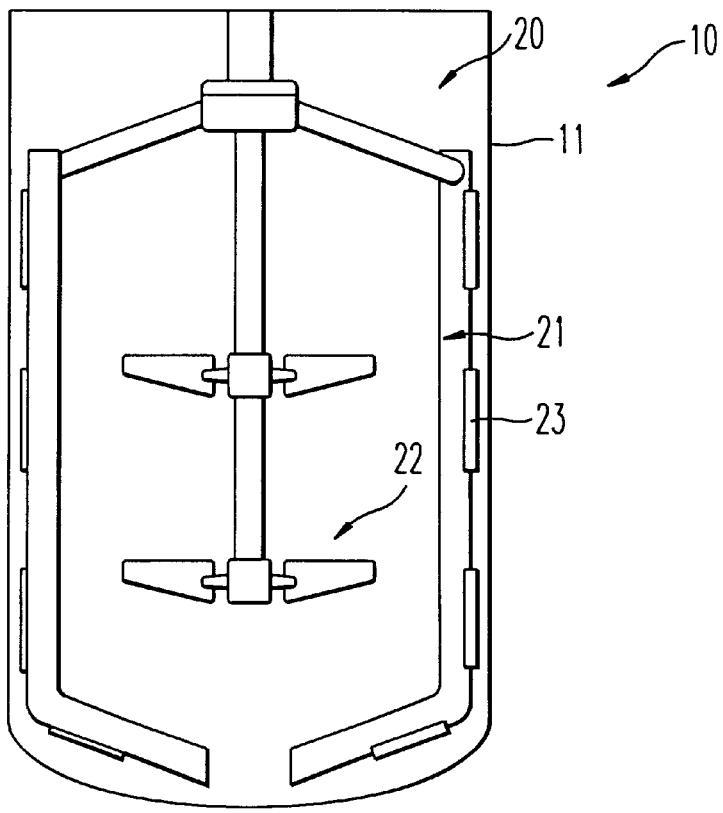
FIG. 4 shows a diagrammatic view of part of a stirred-vessel reactor, in longitudinal section, with a coaxial stirrer.

In FIG. 4 finally, there is a further variant in which a coaxial stirrer 20 is used. The coaxial stirrer 20 consists of a close-clearance anchor stirrer 21 and a central stirrer 22. In the case of the embodiment shown a plurality of scrapers 23 can be seen at the outer edge of the anchor stirrer 22, which mehanically mix the marginal layer at the internal wall of the vessel 11. The anchor can also be closed in the bottom half.

In the partial sections of FIGS. 3 and 4, the drive motors of the stirrer mechanisms are not shown.

The invention is illustrated in more detail below with reference to practical examples.

EXAMPLES

Emulsifier 1: 20% strength by weight solution of a p-octylphenol ethoxylate with 25 mol of ethylene oxide Emulsifer 2: 35% strength by weight solution of a sodium salt of sulfated p-nonylphenol ethoxylate with 25 mol of ethylene oxide

Example 1 (comparison example)

The experiment is conducted in an 18 m³ reactor of h/D=2.1 (height/diameter ratio) fitted with blade stirrer, d/D=0.58 (diameter ratio stirrer blade/reactor), and 35 rpm. An initial charge consisting of 2200 kg of water and 10 kg of ascorbic acid is heated to 80° C. On reaching an internal temperature of 70° C., 200 kg of sodium persulfate solution (2.5% strength by weight) are added. The continuous feeds of the monomer emulsion ME1 and of 1740 kg of sodium persulfate solution are then commenced, the former lasting 210 min, and the latter 240 min, the internal temperature being allowed to rise to 85° C. During the feeds, jacket cooling is operated to the cooling limit. After complete addition, the batch is held at 85° C. for 2 h, cooled, neutralized with ammonia solution and filtered through a 250 μm filter. After the removal by filtration of around 5.7 kg of coagulum, a dispersion having a solids content of 55.7%, a pH of 7.3, an LT (LT=light transmittance, measured with white light, 0.01% strength by weight, 25 mm path length) of 52%, a viscosity of 77 mPas and a content of fine coagulum of 0.017% is obtained. The reactor wall is coated in places with a wall deposit. The particle size distribution is tetramodal (see Tab. 1).

| Composition of ME1: |
|---|
| 1900 kg of water |
| 970 kg of emulsifier 1 |
| 700 kg of emulsifier 2 |
| 194 kg of acrylic acid |
| 1160 kg of acrylonitrile |
| 8315 kg of butyl acrylate |

Example 2

Example 1 is repeated in an 18 m³ reactor of the same construction (same height/diameter ratio and same cooling jacket), having a 4-stage MIG stirrer (d/D=0.85) with blade stages rotationally offset relative to one another by 90°. The stirrer speed is raised to 40 rpm and the total cooling capacity is utilized. In this case the feed time of the monomer emulsion can be reduced to 180 min; the initiator solution is run in for 30 minutes longer as in Example 1. Subsequent procedure is as in the case of Example 1. A coagulum-free dispersion having a solids content of 55.4%, a pH of 7.5, an LT of 50%, a viscosity of 80 mPas and a content of fine coagulum of 0.001% is obtained. The particle size distribution (PSD) is tetramodal (see Tab. 1). There is no wall deposit. The use of a multistage stirrer permits the same amount of heat to be dissipated in a shorter time, reduces the formation of wall deposits and the content of fine coagulum, and leads to a reproducible PSD when 10 successive batches are compared.

Example 3

Example 2 is repeated in the same reactor with the difference that the feed streams are fed in through the reactor floor and the stirrer speed is raised to 43 rpm. In this case, the feed time of the monomer emulsion can be reduced to 165 min. The initiator solution is again run in for 30 minutes longer. A coagulum-free dispersion having a solids content of 55.3%, a pH of 7.5, an LT of 49%, a viscosity of 78 mPas and a content of fine coagulum of 0.001% is obtained. The PSD is tetramodal (see Tab. 1). There is no wall deposit.

TABLE 1

Particle size distribution (determined by an analytical ultracentrifuge; the figures denote the mass fractions within the stated ranges). The values fluctuate within the normal reproducibility of the measurement.

| Example | <100 nm | 100–200 nm | 200–280 nm | 280–430 nm | 430–600 nm | >600 nm |
| --- | --- | --- | --- | --- | --- | --- |
| Ex. 1 | 0 | 27 | 16 | 32 | 24 | 1 |
| Ex. 2 | 0 | 28 | 19 | 25 | 27 | 1 |
| Ex. 3 | 0 | 23 | 24 | 26 | 26 | 1 |

Example 4

Example 2 is repeated in the same reactor with the difference that a feed stream consisting of acrylonitrile and butyl acrylate and a second, aqueous feed stream consisting of water, acrylic acid, emulsifiers and sodium persulfate (proportions as in Example 1) are fed into the reactor from below. The two streams are mixed shortly before entering the reactor. In this case the stirrer speed is raised to 45 rpm and the feed time is extended to 180 minutes. The aqueous feed stream is run in more slowly by 15 minutes. After complete addition, the batch is held at polymerization temperature for 2 hours more, cooled and filtered to remove coagulum. A dispersion with a solids content of 55.3% and a pH of 7.8 is obtained. The PSD and viscosity are not significantly different from that of Example 3.

| Composition of ME5: |
| --- |
| 1915 kg of water |
| 750 kg of emulsifier 2 |
| 227 kg of acrylic acid |
| 567 kg of acrylonitrile |
| 794 kg of vinyl acetate |
| 9956 kg of butyl acrylate |

Example 6

Example 3 is repeated with the formulation of Example 5. Utilizing the cooling capacity limit, the monomer emulsion can be run in over 5.5 h. After the removal by filtration of around 3 kg of coagulum, a dispersion having a solids content of 64.9%, a pH of 4.5, an LT of 34%, a viscosity of 227 mPas and a content of fine coagulum of 0.003% is obtained. The reactor wall is free from deposits. The PSD is trimodal (cf. Table 2).

TABLE 2

Particle size distribution (determined by an analytical ultracentrifuge; the figures denote the mass fractions within the stated ranges). The values fluctuate within the normal reproducibility of the measurement and are mean values from 5 batches.

| Example | <100 nm | 100–250 nm | 250–400 nm | 400–600 nm | 600–800 nm | >800 nm |
| --- | --- | --- | --- | --- | --- | --- |
| Ex. 5 | 0 | 12 | 40 | 12 | 35 | 1 |
| Ex. 6 | 0 | 12 | 41 | 8 | 36 | 3 |

Example 5 (comparison example)

In the reactor from Example 1, a mixture of 1980 kg of water and 11 kg of ascorbic acid is heated to 82° C. at 40 rpm. On reaching an internal temperature of 70° C., 230 kg of sodium persulfate solution (2.5% strength by weight) are added. The continuous feeds of the monomer emulsion ME5 and of 730 kg of sodium persulfate solution (7% strength by weight) are then commenced, the former lasting 7 h, and the latter 7.25 h. During the feeds, jacket cooling is operated to the cooling limit. After complete addition, the batch is held at polymerization temperature for 2.5 h and filtered through a 250 μm filter. After the removal by filtration of around 25 kg of coagulum, a dispersion having a solids content of 65.7%, a pH of 4.6, an LT of 36%, a viscosity of 250 mPas and a content of fine coagulum of 0.010% is obtained. The reactor wall is coated lightly with a wall deposit. The PSD is trimodal (see Tab. 2).

Example 7

Example 5 is repeated with the modification that the dispersion obtained, following the complete addition of the feed streams, is afterpolymerized for 2.5 h, in the course of which 270 kg of 10% strength by weight tert-butyl hydroperoxide solution and, after 5 minutes, a solution of 170 kg of 10% strength by weight sodium hydroxymethanesulfinate (Rongalit C) are added over 1 h. The proportion of residual monomers is subsequently less than 500 ppm in total. The PSD is as in Example 5.

We claim:

1. A process for preparing a polymer dispersion by emulsion polymerization, comprising introducing at least one monomer into a stirred-vessel reactor from below through a floor of said reactor, while producing a flow field in said reactor having not only a tangential flow component but also an axial flow component, said flow field being produced by at least one single-stage or multistage stirrer having two or more flow directors per blade or having multiplanar ends; and emulsion polymerizing said monomer.

2. The process of claim 1, wherein said stirrer is a multi-blade stirrer.

3. The process of claim 1, wherein said stirrer is a multistage pulse counter current stirrer or Interference multistage pulse counter current stirrer.

4. The process of claim 1, wherein said reactor has no flow-disrupting internals (baffles) and the ratio of stirrer diameter to reactor diameter is from 0.7 to 0.9.

5. The process of claim 1, wherein said reactor has at least one flow-disrupting internal component and the ratio of stirrer diameter to reactor diameter is from 0.6 to 0.8.

6. The process of claim 1, wherein the ratio of the distance separating successive stirrer stages axially from each other to the reactor diameter is in the range from 0.75 to 1.3.

7. The process of claim 1, wherein the ratio of the distance of the lowest stirring stage from the floor of said reactor to the diameter of the lowest stirring stage is from 0.3 to 1.

8. The process of claim 1, wherein said monomers are passed into said reactor as an aqueous emulsion.

9. The process of claim 1, wherein the monomers are passed into said reactor in pure form and are dispersed in an aqueous phase contained in said reactor.

10. The process of claim 1, wherein said monomers are passed into said reactor together with said aqueous phase.

11. The process of claim 1, wherein said polymer dispersion has a viscosity of from 0.01 to 50 Pas.

12. The process of claim 1, wherein said polymer dispersion is a styrene-butadiene, styrene-acrylate, vinyl acetate or acrylate dispersion.

* * * * *

UNITED STATES PATENT AND TRADEMARK OFFICE
CERTIFICATE OF CORRECTION

PATENT NO. : 6,252,018 B1
DATED : June 26, 2001
INVENTOR(S) : Rupaner et al.

It is certified that error appears in the above-identified patent and that said Letters Patent is hereby corrected as shown below:

<u>Title page,</u>
Item [30], the Foreign Application Priority Data has been omitted, it should read as follows:
-- [30]      Foreign Application Priority Data
Mar. 17, 1997      (DE) ............................. 197 11 022 --

Signed and Sealed this

Twelfth Day of November, 2002

*Attest:*

*Attesting Officer*

JAMES E. ROGAN
*Director of the United States Patent and Trademark Office*